Dec. 13, 1949 J. J. RAVERS, JR 2,491,333
HITCH
Filed April 15, 1948 2 Sheets-Sheet 1
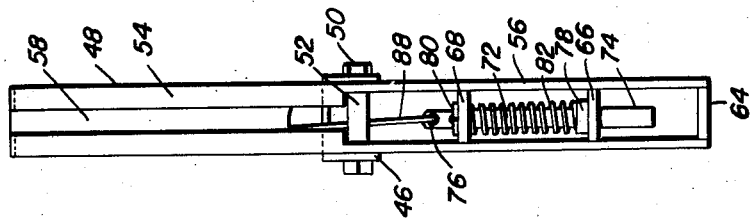
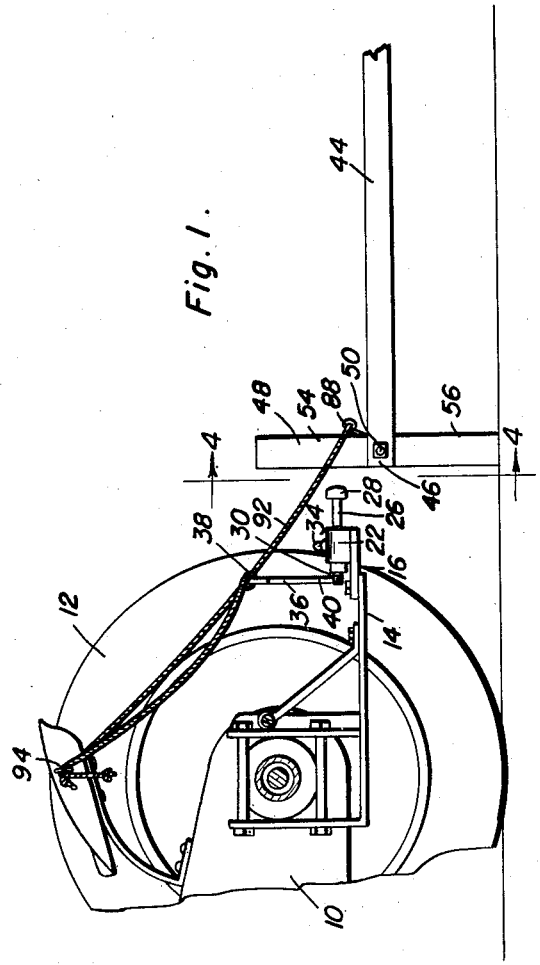
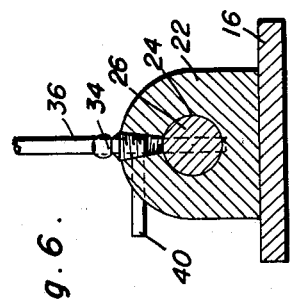
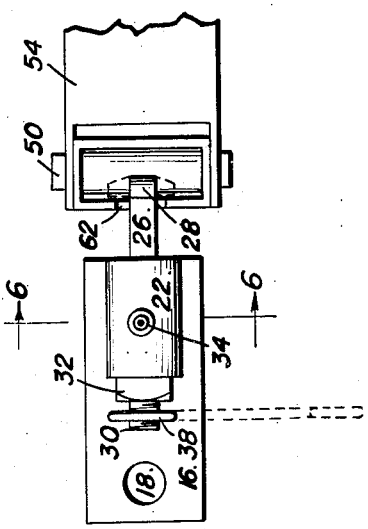
Jerry J. Ravers, Jr.
INVENTOR.
BY
*Thomas A. O'Brien*
*and Harvey B. Jacobson*
Attorneys Dec. 13, 1949  J. J. RAVERS, JR  2,491,333
HITCH
Filed April 15, 1948  2 Sheets-Sheet 2
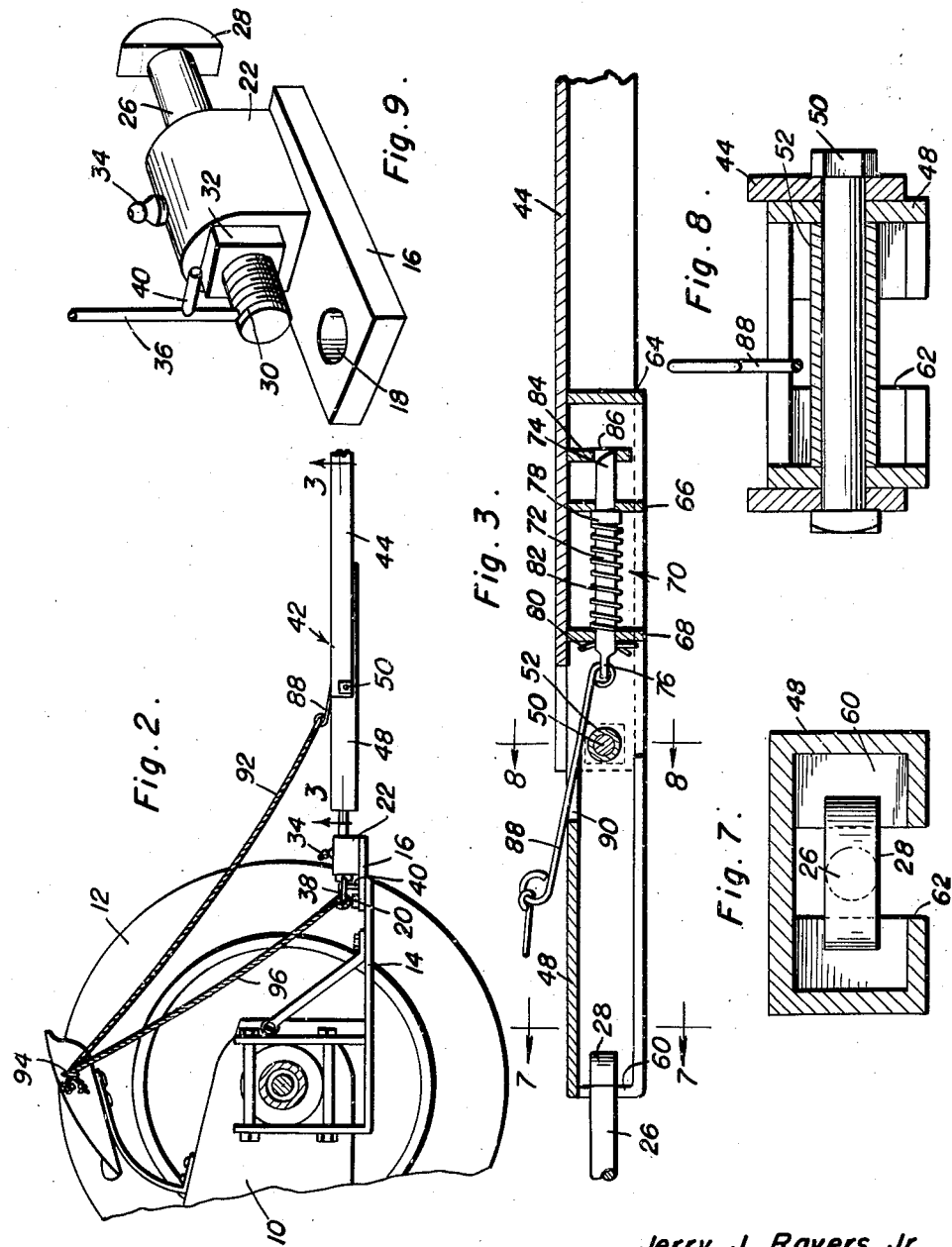
Jerry J. Ravers, Jr.
INVENTOR.

Patented Dec. 13, 1949

2,491,333

UNITED STATES PATENT OFFICE 2,491,333

HITCH

Jerry J. Ravers, Jr., Amiret, Minn.

Application April 15, 1948, Serial No. 21,295

11 Claims. (Cl. 280—33.44)

1

This invention relates to an automatic hitch mechanism for connecting a tractor, truck or other pulling or powered unit with a drafted vehicle, machine or tool of agricultural, industrial or pleasure use.

The primary object of this invention is to provide means for automatically connecting and disconnecting a pulling and drafted structure, responsive to manipulation of the pulling unit and to a slight manual power effected by the operator of the pulling vehicle from his operating position or station.

Another object of this invention is to provide means for supporting a trailer or similar draft vehicle in hitching position, while it is being connected or unhitched from the powered unit.

Another object of this invention is to provide means for enabling the powered unit, such as an agricultural tractor, to momentarily free itself from the weight or drag of the draft vehicle, such as a conventional farm implement, upon becoming mired in a wet field or the like, so that the tractor is allowed to move a slight distance unincumbered.

Another important object of this invention to be herein enumerated resides in the provision of an automatic hitch mechanism, adaptable for use in association with any type of conventional pulling unit and draft vehicle, which is inexpensive and durably constructed for reliable and efficient use and which is easily attached to conventional towing and draft units for facilitating the coupling and uncoupling of the draft vehicle.

These and ancillary objects, which will be apparent from a perusal of the following description, in view of the accompanying drawings, wherein:

Figure 1 is a side elevational view of the rear end of a tractor, illustrating in elevation this invention, the same being shown in an inoperative position for supporting the drafted vehicle in a potential coupling position;

Figure 2 is a similar side elevational view, showing this invention in an operative association with a tractor;

Figure 3 is a vertical sectional view taken substantially on the longitudinal plane of line 3—3 of Figure 2;

Figure 4 is a front elevational view taken substantially on line 4—4 of Figure 1;

Figure 5 is a fragmentary top plan view of the structure appearing generally in Figures 1 and 2;

Figure 6 is a vertical sectional view taken substantially on the transverse plane of line 6—6 of Figure 5;

2

Figure 7 is a sectional view taken substantially on the plane of line 7—7 of Figure 3;

Figure 8 is a transverse vertical sectional view taken substantially on the plane of line 8—8 of Figure 3; and Figure 9 is a perspective view of the coupling structure, shown generally in attachment to a tractor, in Figures 1 and 2 of the drawings.

Referring now more particularly to the drawings wherein similar characters of reference designate corresponding parts throughout, and wherein a preferred embodiment of this invention is illustrated, by way of example only, the same being constructed and designed for use in association with any type of powered unit and drafted vehicle or unit, the numeral 10 designates a conventional tractor, having a usual frame structure carried on rear traction wheels 12. A conventional drawbar 14 is connected to the main frame in any suitable manner and extends rearwardly therefrom. Seated on the end of the drawbar, in a projected fashion, and retained in said placement by any suitable securing means is a plate 16, having an aperture 18 at one end for receiving securing means, such as a bolt assembly 20 or the like. Formed integrally with the plate 16, at the opposite end from the aperture 18 and upstanding therefrom is a coupling block or sleeve 22 having a longitudinal bore 24 centrally extending therethrough. A draft bolt 26 is rotatably received within the bore 24 and comprises a half-moon coupling lug 28 disposed at one end thereof. The opposite end 30 of the shank 26 is suitably threaded for accommodating stop means 32, such as a nut or the like, whereby the bolt is secured to the sleeve 22 and retained in adjustable position therein. Of course, lubrication fittings 34 may be provided, wherever deemed necessary, to lubricate and reduce friction between the bored sleeve and the longitudinally extending coupling rod 26. Secured to the extending end 30 and extending therefrom is an operating lever 36, terminating in a loop end 38, for a purpose to be later described. Laterally extending from the operating lever, adjacent the secured end thereof, is a positioning finger 40, adapted to abut the plate 16, as will be later described.

The numeral 42 generally denotes the combination stand and hitch assembly, which is secured at one end by a conventional means to a draft vehicle and is conveniently coupled and uncoupled from the drawbar 14, through the medium of the coupling lug 28, responsive to manipulation of the lug and movement of the tractor. The hitch assembly 42 comprises a channel bar or tongue 44 having one end secured to the draft vehicle, the opposite end terminating in a pair of opposed arms 46, having aligned apertures therein. A radius hitch bar 48 is pivoted between the extending arms 46 by a pivot pin 50, a suitable bushing 52 being provided. The radius hitch bar 48 is divided by the pivot pin 50 into a forward section 54 and a rearward section 56. The forward section 54 is substantially closed, having a longitudinal slot 58 formed on the bottom portion thereof and extending vertically in the forward connecting plate 60. The slot 58, in association with the opposed longitudinal edges of the bottom portion of the section 54, defines a guideway or trackway 62. The rearward section 56 is substantially open at the top and bottom, having extending parallel arms, which are joined at their extremities by a transverse plate 64, adapted to serve as a foot, when the radius bar serves as a stand support. A pair of transverse plates 66 and 68 are disposed between the parallel arms of the section 56 in longitudinal spaced placement and function to retain a locking structure 70 therein. The locking assembly 70 comprises a locking pin 72, retained in the section 56 of the bar 48, through the medium of longitudinally aligned apertures disposed in the plates 66 and 68. The pin 72 has an extending cam end 74, the opposite end being suitably apertured, as at 76. The pin 72 is adapted for longitudinal movement within the plates 66 and 68, the movement forwardly being limited by a stop plate 78, disposed on the shank of the pin, and a cotter pin 80 which is inserted through the pin, adjacent the apertured end 76 and braced on the outer surface of the plate 68. A coil spring 82 is received around the pin, between the stop plate or collar 78 and the plate 68, and serves to yieldingly bias or urge the cam end 74 relative to a locking plate 84, having an aperture 86 therein, the plate 84 depending from the inner surface of the bar 44. A connecting rod 88 is secured to the apertured end 76 of the locking pin, the connecting rod 88 extending through an opening 90 formed in the section 54 of the bar. The opposite end of the connecting rod 88 is communicated with a flexible operating element 92, having its opposite end secured to the seat of the tractor by a pin 94 extending therefrom.

Referring to Figure 2 of the drawings, when it is desired to disconnect the tractor, leaving the draft vehicle behind, an operator seated on the tractor seat merely moves the adjustable operating chain or rope 92 forwardly. This imparts a forward movement to the locking pin 72 and moves the cam end 74 out of engagement with the apertured plate 84 of the draft bar 44. The radius bar 48 then pivots on its pivot point 50 into a stand position, as shown in Figure 1 of the drawings. A connecting chain or rope 96 is secured to the connecting pin 94 on the tractor seat and to the loop extremity 38 of the operating lever 36, so that a pull exerted on the rope 96 moves the operating lever upwardly and positions the coupling lug 28 in vertical relation to the guideway 62, shown in Figure 7. The operator now merely drives the tractor forwardly, as the hitch is entirely disconnected, and forward motion of the tractor removes the coupling lug 28 entirely from the track or guideway 62 and frees the hitch mechanism 42 from the coupling lug 28. The draft vehicle is set free from the power unit and supported by the radius rod, adapted to serve as a stand, as shown in Figure 1 of the drawings.

When the operator decides to re-establish the hitch connection, with reference to Figure 1 of the drawings, the tractor is moved rearwardly and the coupling lug 28 is positioned in vertical placement so that it is easily moved into the slot 58. The operating lever is now turned until the positioning finger 40 abuts the top surface of the plate 16, thus indicating that the coupling lug 28 is transversely positioned within the guideway. Forward movement of the tractor moves the radius bar on its pivot 50 and advances the locking pin 72 relative to the bar 44. The cam end 74 is biased into the aperture 86 by the spring 82, functioning to lock the sections 44 and 48 together.

When the device is employed for use in attaching an agricultural implement to a tractor, it functions to aid the tractor in its movement over wet or muddy ground. When the tractor becomes stuck in rain-drenched soil or the like, the drag of the implement forestalls forward motion thereof and necessitates the employment of an additional powered unit. However, in this circumstance, the operator, by exerting a forward pull on the rope 92, moves the coupling pin 72 out of engagement with the bar 44 and pivots the radius bar 48 on its pivot 50. Thus, a slight forward motion of the tractor is permissible, without realizing the drag on additional weight of the implement.

Of course, it is to be apparent that the coupling and hitch mechanism may be easily employed by a motor vehicle for drafting a pleasure trailer, and in such use the ropes 92 and 96 would be supplanted by a conventional operating medium, such as an electrical or mechanical operator. However, the means provided for operating the locking pin 72 and the coupling lug 28 would be dependent on the method of installing the coupler and hitch. It is to be apparent that a very simple and efficient coupling and hitch device is provided for establishing a coupled relation between a powered unit and a draft vehicle.

However, the foregoing illustration is to be understood as disclosing an embodiment of this invention by way of example only, and further that suitable modifications may be made in the structure as disclosed, provided such modifications come within the spirit of the invention and the scope of the appended claims.

Having described the invention, what is claimed as new is:

1. A hitch for use with a powered unit having a drawbar and a trailer having an extending tongue comprising a connecting bar pivotally mounted on a horizontal axis to said tongue, a coupling rod rotatably mounted on the draw bar and extending rearwardly thereof, a guideway longitudinally disposed in said connecting bar, means for locking said coupling rod in the guideway for moving said connecting bar into horizontal placement with said tongue, means carried by the connecting bar for locking engagement with the tongue when in said placement and remote control operating means for disengaging said locking means.

2. The combination of claim 1, wherein said coupling locking means includes an enlarged head on said rod, means for rotating said head into vertical and horizontal positioning in the guideway and stop means for limiting movement of the head relative to a horizontal plane.

3. The combination of claim 1, wherein said locking means includes a resiliently biased locking pin slidably mounted in the connecting bar, a perforated locking plate transversely carried by said tongue for selectively receiving and retaining said pin upon horizontal positioning of the connecting bar and a cam end on said pin engageable on said locking plate.

4. The combination of claim 2, wherein said means for rotating the rod includes an operating lever secured to said rod, a flexible connecting member attached to said lever and an operator's seat for imparting movement to the lever.

5. A hitch for use with a powered unit and a trailer having an extending tongue comprising a connecting bar pivotally carried by the tongue, a coupling rod rotatably mounted on the powered unit and having an enlarged extending end, a guideway formed in said connecting bar for receiving and retaining the enlarged end of said rod when said connecting bar is disposed in a vertical position, a spring urged locking plunger slidably carried by said connecting bar and engageable in said tongue for locking said connecting bar in a horizontal position to said tongue, remote control operating means associated with said plunger and powered unit for disengaging said plunger from the tongue and means for rotating said rod to lock said coupling end in said guideway.

6. A hitch for use with a powered unit and a trailer having an extending channel member comprising a connecting bar pivotally mounted on a horizontal axis to said channel member, a longitudinal guideway formed in the underside of said connecting bar, a coupling rod rotatably carried by the powered unit and extending rearwardly thereof, said rod having an enlarged extending end adapted to engage in said guideway when the bar is vertically disposed, means for rotating said rod to lock said head in the guideway whereby forward movement of the powered unit swings the connecting bar rearwardly and upwardly into a nested placement within the channel member, a perforated locking plate transversely disposed in said channel member, a spring urged locking plunger slidably carried by said connecting bar and adapted to engage in said plate, remote control means associated with said powered unit and plunger for disengaging from the plate.

7. The combination of claim 6, wherein said last means includes an arm carried by the plunger and extending through the connecting bar and a flexible member connected to said arm and carried by the powered unit.

8. The combination of claim 6, wherein said coupling rod is provided with an arm laterally extending therefrom, a flexible connecting member secured to said arm for rotating said rod to disengage the extending end from the guideway and a positioning finger laterally carried by the arm.

9. The combination of claim 6, wherein said enlarged end includes a head having an outer arcuate face and an inner straight face, said straight face being adapted to slidably engage in said guideway.

10. The combination of claim 6, wherein stop means is disposed at the outer end of said guideway.

11. A hitch assembly in combination with a powered unit having a draw bar and a trailer having an extending channel member comprising a connecting bar pivotally attached to said tongue and adapted for vertical swinging movement about a horizontal axis, a guideway longitudinally formed in the underside of said connecting bar, a block mounted on said draw bar, a coupling rod rotatably disposed in a horizontal position in and through said block, an enlarged transverse head on one of the extending ends of said rod, said head extending rearwardly of the draw bar and adapted to be disposed in a vertical position within the guideway when the connecting bar is vertically disposed, a lateral operating arm on the other end of said rod, remote control means associated with the arm for rotating said rod, stop means carried by said arm for limiting the rotative movement of the rod, a spring urged locking plunger slidably carried by said connecting bar, a cam end on said plunger, a perforated plate disposed transversely in said channel member and adapted to receive the plunger when the connecting bar is swung to a nested placement within the channel member and remote control means for disengaging said plunger from the plate.

JERRY J. RAVERS, Jr.

REFERENCES CITED

The following references are of record in the file of this patent:

UNITED STATES PATENTS

| Number | Name | Date |
|---|---|---|
| 1,943,594 | Fatley | Jan. 16, 1934 |
| 2,327,308 | Johnston | Aug. 17, 1943 |
| 2,328,850 | Sensenig | Sept. 7, 1943 |